US010019682B2

(12) United States Patent
Farrelly et al.

(10) Patent No.: US 10,019,682 B2
(45) Date of Patent: Jul. 10, 2018

(54) UNAUTHORIZED VEHICLE DETECTION

(71) Applicant: Ford Global Technologies, LLC, Dearborn, MI (US)

(72) Inventors: Will Farrelly, Chelmsford (GB); Douglas Nicoll, Chelmsford (GB); Jonathan Scott, Chelmsford (GB); David Skipp, Brentwood (GB); Richard Brown, London (GB); Eric H. Wingfield, Ann Arbor, MI (US); Nikola Ristivojevich, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 14/670,731

(22) Filed: Mar. 27, 2015

(65) Prior Publication Data
US 2015/0310744 A1  Oct. 29, 2015

Related U.S. Application Data

(60) Provisional application No. 61/985,010, filed on Apr. 28, 2014, provisional application No. 61/985,004, (Continued)

(51) Int. Cl.
*G08G 1/14* (2006.01)
*G06Q 10/06* (2012.01)
(Continued)

(52) U.S. Cl.
CPC ..... *G06Q 10/063114* (2013.01); *G01C 21/34* (2013.01); *G06Q 10/20* (2013.01);
(Continued)

(58) Field of Classification Search
CPC .......... G08G 1/14; G08G 1/141; G08G 1/142; G08G 1/143; G08G 1/144
See application file for complete search history.

(56) References Cited

U.S. PATENT DOCUMENTS 6,266,609 B1  7/2001  Fastenrath
7,528,740 B2  5/2009  Hess et al.
(Continued)

FOREIGN PATENT DOCUMENTS

EP   1475648 A1   11/2004
EP   2608184 A1   6/2013
(Continued)

OTHER PUBLICATIONS

Parking sensors to take pain out of finding a space, NewScientist Tech, Feb. 1, 2012, www.newscientist.com/article/mg21328506. 100-parking-sensors-to-take-pain-out-of-finding-a-space.html, (4 pages).
(Continued)

*Primary Examiner* — Hongmin Fan
(74) *Attorney, Agent, or Firm* — Jennifer M. Stec; Bejin Bieneman PLC

(57) ABSTRACT

A request for a parking space is received from a requesting vehicle. Data is received from at least one data-collecting vehicle related to at least one parking space. Based at least in part on the received data, a parking availability map is generated indicating a parking space appropriate for the requesting vehicle. If the parking space is occupied by an unauthorized vehicle, a message is provided to a parking enforcement authority that the parking space is occupied by an unauthorized vehicle.

14 Claims, 2 Drawing Sheets

Related U.S. Application Data filed on Apr. 28, 2014, provisional application No. 61/985,005, filed on Apr. 28, 2014, provisional application No. 61/985,009, filed on Apr. 28, 2014, provisional application No. 61/985,011, filed on Apr. 28, 2014.

(51) Int. Cl.
*G06Q 30/02* (2012.01)
*G06Q 10/00* (2012.01)
*G01C 21/34* (2006.01)
*G08G 1/005* (2006.01)
*G08G 1/00* (2006.01)
*G06Q 50/30* (2012.01)

(52) U.S. Cl.
CPC ..... *G06Q 30/0203* (2013.01); *G06Q 30/0206* (2013.01); *G06Q 30/0207* (2013.01); *G08G 1/005* (2013.01); *G08G 1/14* (2013.01); *G08G 1/202* (2013.01); *G08G 1/205* (2013.01); *G01C 21/3438* (2013.01); *G06Q 50/30* (2013.01)

(56) References Cited

U.S. PATENT DOCUMENTS

| | | |
|---|---|---|
| 7,834,778 B2 | 11/2010 | Browne et al. |
| 8,571,740 B2 | 10/2013 | Hyde et al. |
| 8,671,014 B2 | 3/2014 | Stefik et al. |
| 2007/0029825 A1* | 2/2007 | Franklin .................. B60R 9/10 293/128 |
| 2007/0040701 A1* | 2/2007 | Browne ................. G08G 1/143 340/932.2 |
| 2008/0211689 A1 | 9/2008 | Takahashi et al. |
| 2010/0302068 A1 | 12/2010 | Bandukwala |
| 2012/0112929 A1 | 5/2012 | Gupta et al. |
| 2013/0073350 A1 | 3/2013 | Blustein |
| 2013/0103200 A1 | 4/2013 | Tucker et al. |
| 2013/0143536 A1 | 6/2013 | Ratti |
| 2013/0179383 A1 | 7/2013 | Pringle et al. |
| 2013/0325565 A1 | 12/2013 | Toussaint |
| 2014/0085112 A1 | 3/2014 | Gruteser et al. |
| 2014/0118167 A1 | 5/2014 | Im et al. |
| 2014/0149153 A1 | 5/2014 | Cassandras et al. |
| 2014/0266804 A1* | 9/2014 | Asadpour ............... G08G 1/143 340/932.2 |
| 2014/0306833 A1* | 10/2014 | Ricci ....................... B60Q 1/00 340/901 |
| 2014/0313058 A1* | 10/2014 | Chen ..................... G08G 1/141 340/932.2 |

FOREIGN PATENT DOCUMENTS

| | | |
|---|---|---|
| KR | 101125153 B1 | 4/2012 |
| KR | 101304206 B1 | 9/2013 |
| KR | 1020130106028 | 9/2013 |
| WO | WO 2011023292 A1 | 3/2011 |
| WO | WO 2012004191 A1 | 1/2012 |
| WO | WO 2013072105 A1 | 5/2013 |

OTHER PUBLICATIONS

The app that can find a parking space: Street sensors will alert drivers when there is an empty bay, MailOnline, Aug. 6, 2012, © Associated Newspapers Ltd., 5 pages.

* cited by examiner

UNAUTHORIZED VEHICLE DETECTION

RELATED APPLICATIONS

This application claims priority to Provisional Application Ser. No. 61/985,010 filed Apr. 28, 2014 entitled "Identifying Vehicle Parking"; Provisional Application Ser. No. 61/985,004 filed Apr. 28, 2014 entitled "Facilitating Vehicle Parking", Provisional Application Ser. No. 61/985,005 filed Apr. 28, 2014 entitled "Unauthorized Vehicle Detection"; Provisional Application Ser. No. 61/985,009 filed Apr. 28, 2014 entitled "Vehicle Parking Facilitated by Public Transmit Conveyances"; and Provisional Application Ser. No. 61/985,011 filed Apr. 28, 2014 entitled "Air Quality Improvements from Vehicle Parking, each of which provisional applications are hereby incorporated herein by reference in their respective entireties.

BACKGROUND

Personal vehicles such as automobiles and motor bikes may provide a flexible form of transportation for commuters and passengers in urban environments. However, owning and operating a personal vehicle can be expensive when costs for the vehicle, fuel, insurance, and maintenance are factored in. In addition, personal vehicles increase congestion and pollution in urban environments. Further, finding parking can be cumbersome. Public transit systems, including buses, trains, subways, etc., that operate on a fixed schedule, are an alternate lower cost option for commuters. Shared transportation options reduce in-city congestion and improve air quality. In addition, the hassle of parking is avoided. However, a commuter may have limited flexibility in terms of departure and arrival times, as well as departure and arrival location.

Another shared transportation option that provides a mix of flexibility, cost, ease of use, and environmental impact is a shared vehicle system. That is, a fleet of vehicles can be distributed over an operating zone (e.g., a city) and a user can rent any vehicle of the fleet for a short period (e.g., a few hours of a day). For example, shared vehicles may be provided at designated parking spots in the operating zone, in a dedicated or shared parking lot, etc. Once a user account is set up, the user can identify a vehicle that the user wishes to rent based on the vehicle's location within the operating zone, and can rent the vehicle efficiently and quickly, often without requiring additional paperwork. The user can then return the vehicle to the point of origin or drop off the vehicle at any one of one or more alternate locations that may be available, as per the user's convenience. The shared vehicle system reduces the user's commuting costs while also reducing in-city congestion and pollution. At the same time, the ability to pick-up and drop-off a vehicle at a time and location determined by the user provides increased flexibility and efficiency for the user.

Unfortunately, when using personal vehicles or shared vehicles, parking often presents difficulties for a user. For example, there may be situations where a parking space is expected to be open, but there is an obstruction impeding a vehicle from being parked in the space. As a result, while a user is directed to a parking space, the user may not park in the designated space, leading to frustration and/or dissatisfaction. At the same time, a parking system server may not possess data from which it can determine why a user is not parking in the available space. An obstruction may be a movable one, such as a shopping cart left inadvertently in the spot. Alternatively, an obstruction may be due to an unauthorized vehicle having parked in the parking spot without authorization from the parking system.

A dedicated patrol system (e.g., one or more patrol vehicles with dedicated drivers) may be maintained by a parking authority so as to intermittently verify the authority of vehicles that are parked. In addition, the patrol system may assess parking space availability. However, a patrol system undesirably adds costs and complexity to the parking system.

DESCRIPTION

Figure 1:
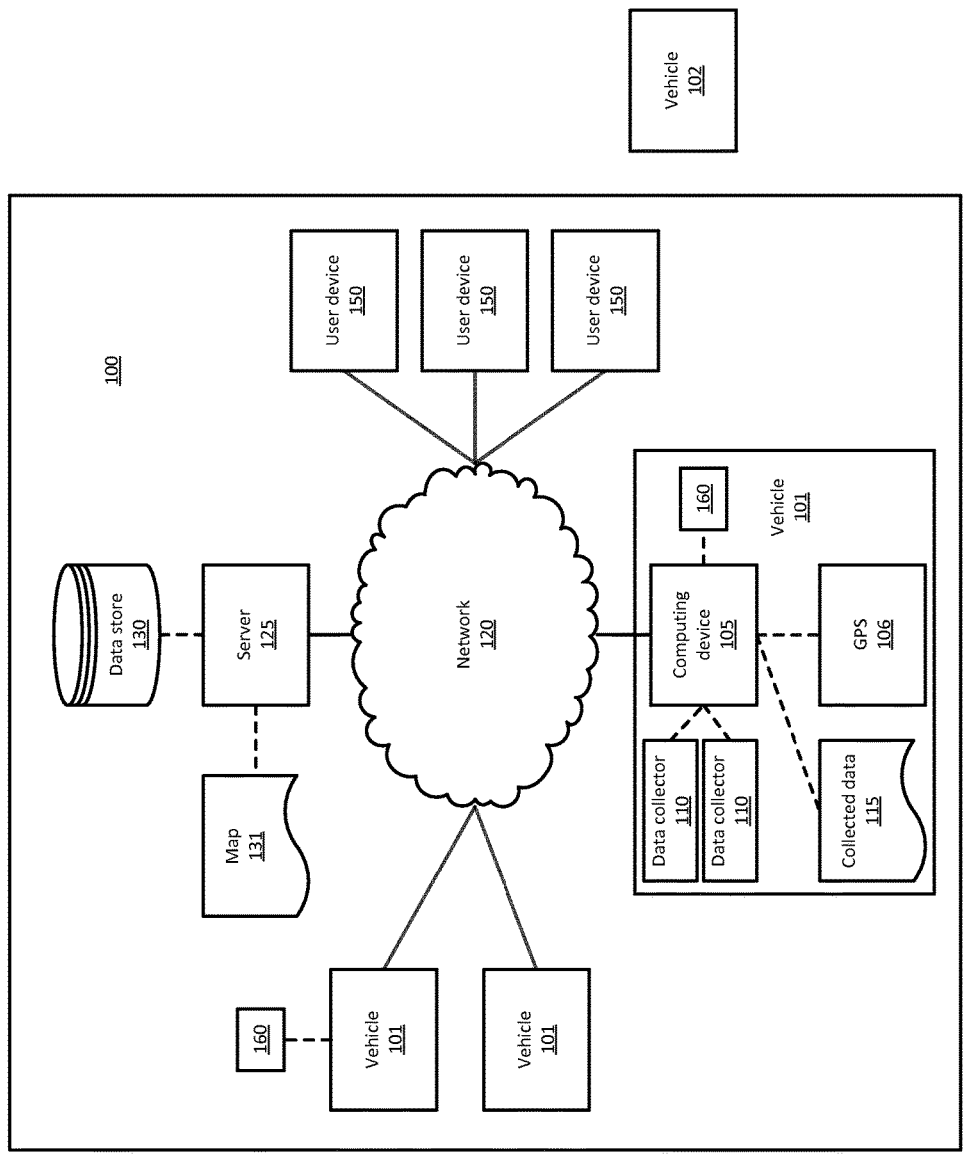
FIG. 1 is a block diagram of an exemplary parking monitoring and/or control system.

FIG. 1 is a block diagram of an exemplary parking monitoring and/or control system 100 that includes at least one, and typically a plurality, of vehicles 101. Each vehicle 101 includes a computer 105 (shown with respect to one example vehicle 101 in FIG. 1 for ease of illustration) communicatively coupled with one or more sensor data collectors 110 in the vehicle 101. The sensors 110 that gather collected data 115 relating to an environment proximate to a respective vehicle 101 including a sensor 110, e.g., objects at locations in an area around the vehicle 101. Data 115 may also be provided from other sources, such as a navigational system 106 using a global positioning system (GPS) or the like in a vehicle 101. In one example, a system and method is provided whereby a server 125, 125 is programmed to identify a presence of an unauthorized object, typically a vehicle, in a location, typically a parking space, based on sensor 110 data 115 received via a network 120 from one or more vehicles 101 proximate to, e.g., moving past and/or within a predetermined distance of, the parking space. Accordingly, data 115 may be received from a vehicle 101 being directed to a designated parking spot, as well as other vehicles 101 passing by the designated parking spot.

Based on data 115 received from one or more vehicles 101, which may be stored in a data store 130 included in or communicatively coupled to the server 125, 125, the server 125, 125 may generate a parking map 131, sometimes referred to as parking heat map 131. For example, navigational data 115, e.g., from a navigational system 106 in a vehicle 101, and sensor data 115 from one or more vehicles 101 may be combined to identify unauthorized parking or to detect the presence and/or size of an obstruction in a parking space. The nature of an obstruction may be identified based on its size. For example, a small movable obstruction (e.g., a shopping cart left in the parking spot) may be differentiated from a larger less movable obstruction (e.g., an unauthorized vehicle) based on sensor 110 data 115. That is, the server 125 receives the data 115 and uses it in generating the map 131 indicating, e.g., available and unavailable parking spaces, spaces having unauthorized vehicles parked therein, etc.

In addition, data may be received from a user device 150, e.g., a smartphone or the like, and/or from a dedicated portable device 160 that is moved between vehicles, such as a fob or dongle that includes a microprocessor and that communicates with a vehicle computer 105 or the server 125 in a known manner. By "dedicated" it is meant that the device 160 is programmed to communicate a location to the server 125, 125, either directly via the network 120, or via the computer 105 and the network 120, but the device 160 is typically not used, or programmed, for other purposes. The device 160 can moved between vehicles by the user, the dongle communicatively coupled to the server 125. Further still, data may be received at the server 125, 125 from a personal mobile device 150 of the user, such as a smartphone, while the device 150 is positioned in a vehicle 101, as mentioned above. Still other sensor 110 data 115 may be provided from sensors 110 such as radars, ultrasound sensors, image capture devices (such as in-vehicle cameras), time devices or clocks, etc.

In one example, based on a parking availability map 131, sometimes referred to as parking heat map 131, the location of available and/or in-use parking spaces may be known to the server 125, e.g., stored in the data store 130. A user requesting parking information may be directed to a parking spot based on the parking heat map 131, and further based on characteristics, e.g., dimensions such as length and width, of the vehicle 101 being operated and to be parked. For example, the user may be directed to a parking spot where the dimensions of the parking spot best match the size of the vehicle 101. The user may be provided with navigational information directing the user to the designated parking space.

However, if the user does not go to the designated space, but keeps driving through or around an area where the user is seeking to park, the server 125 may use data received from a vehicle 101 identified with the user, as well as one or more other vehicles 101 passing in the vicinity, e.g., within a predetermined radius such as 100 meters, 500 meters, etc., to update a state, e.g., empty or occupied, of the designated parking space.

For example, based on a flow of vehicles 101 looking for a parking space, location data 115 relating to vehicles 1011, historical parking data, i.e., a frequency according to which respective parking spaces in an area are occupied at one or more times of day, days of the week, etc., the server 125 may be programmed to determine whether there is an unauthorized vehicle in the parking space. For example, if the heat map 131 indicates that there is an available parking space, but vehicles 101 looking for parking continue to drive, e.g., circle, near and/or around the designated space without parking in it, and/or if a user who usually parks in the given space does not park in it, it may be determined that the space is blocked by a vehicle 102 not included in the system 100. That is, there is no information about this vehicle 102 on the parking heat map 131, it may be inferred that the vehicle 102 in the parking space of interest is not authorized to be there, and that a parking transgression has occurred. The appropriate authorities may then be notified, e.g., according to programming in the server 125.

Alternatively or additionally, it may be determined, e.g., in the server 125 125, that one or more vehicles 101 are passing an available parking spot due to the space being too small for the vehicles 101. In this example, the sensor data 115 received in the server 125 from the one or more vehicles 101 is used to verify the predicted dimensions of the parking space. Based on differences between the predicted parking space dimensions and the actual parking space dimensions, as indicated by the sensor data 115 from the passing vehicles 101, the parking space availability on the parking heat map 131 may be updated. For example, the parking heat map 131 may be updated to indicate that the given parking space being passed by average sized vehicles 101 is not large enough for these vehicles, but may be acceptable for compact vehicles. Accordingly, compact vehicles 101 may be directed to the given parking space.

Parking spaces in the parking heat map 131 may be tagged, e.g., notations may be made by the server 125, 125 and stored in the data store 130, based on general demand in addition to availability at a particular point in time. For example, crowd data, social data, historical data, and real-time data may be combined to determine how many users are looking to park in a certain region, and/or a specific parking spot. Pricing of parking spaces may then be adjusted based on such demand. For example, spots having higher demand (such as those located more centrally in a city) may be priced higher while spots have lower demand (such as those located more peripherally in a city) may be priced lower. The variable pricing model may also provide for better parking monetization.

As an example, historical and real-time data may be used to identify parking "hot spots," i.e., areas of high demand and/or where demand at least sometimes is not met. Therein, parking demand in local areas may be learned. In addition, social media may be used to overlay or include on a map or other interface a dashboard to show parking availability and/or pricing. For example, the historical and real-time data may be integrated with social networking for real time notification and information service.

In this way, vehicles connected to, as well as vehicle unconnected to, a shared vehicle system can augment city parking enforcement by providing data 115 from their sensors 110, e.g., via a computer 105, device 150, or dongle 160. By assisting in city parking enforcement, cost of patrolling is reduced, improving cash flow, especially for municipal bodies.

The updated parking heat map 131 may be used to improve future parking services by providing a more accurate depiction of parking availability. In addition, the updated parking map provides a monetization opportunity that can be used by event planners and/or municipalities for user trip planning, parking planning, event planning, as well as zoning planning. Further, the data may be used for developing dynamic pricing models. The data can also be coordinated with a vehicle as a message or advertising billboard scheme.

Note that differentiation between a vacant space and a space taken by an unauthorized user can be supplemented by using an adjacent vehicle 101 communicating with the server 125 as well as passing vehicles communicating with the server 125. As such, when using a dongle to provide parking spot authorization and to track the location of authorized vehicles in parking spots, ultrasonic positioning sensors of vehicles adjacent to an unknown spot (e.g., a spot where it is not clear whether a vehicle without a dongle is present or no vehicle is present) can detect whether a vehicle is present in the spot and transmit the data to the server 125, so that multiple data from adjacent and/or passing vehicles can be combined to identify whether the spot is vacant or has an unauthorized user (even when the adjacent vehicles are parked an unoccupied).

Further, not only ultrasonic sensors may be used on adjacent vehicles, but cameras, data from users walking by the spot, etc., may also be used. The vehicle sensors utilized to detect presence of a vehicle in an adjacent (side/front/rear) space may be side (left/right), front and rear sensors, respectively, that are also used for parking assistance, automated cruise control, automated parking, etc. The vehicle sensors (including radar, ultrasound, image capture, GPS, clock) and/or portable devices in vehicle may further be used to determine parking space occupancy status (an occupied space, unoccupied space), as well as tag the determination with time and date. The data may be used by the server 125, to characterize parking spots in a map more accurately. For example, the server 125, may identify the predicted size of a vehicle able to utilize a given space, also taking into account a size of an obstruction, such as a shopping cart or other removable obstruction).

Note that in matching requested parking to a particular vehicle, vehicle characteristics beyond vehicle size may be considered. Further, available spots may be matched to a vehicle with certain features and possibly the vehicle may be given preference for such spots. Exemplary vehicle features that may be used include automated parking abilities, particularly for spaces that are very close to the minimum size required for parking a given size vehicle. Further, a given size spot may be matched to smaller vehicles as the degree of traffic and/or speed of traffic around the spot increases.

Note that GPS and vehicle positioning data, possibly in combination with front/rear position sensor data, can provide data on adjacent parking spaces to a server 125, which then combines the data from numerous vehicles to generate a parking availability map. The server 125, may use vehicle identification numbers (VIN) along with vehicle-to-vehicle communication to know the gap/space available between vehicles. This data, along with probability functions can estimate or predict whether the space is more likely to be an unauthorized vehicle.

The data on parking can also be coordinated with and/or provided to municipalities and event organizers/coordinators, and can be interrelated with vehicles as a message or advertising billboard scheme.

The parking space detection and tracking can also be monitored over time so that historical predications can be provided, and to generate real-time map data of parking spaces. Further, the matching of customers to potential vacant spots can also be based on the historical data as well as user preferences, vehicle size, space availability, etc. Feedback from customer behavior can update the map, such as if the user reaches a spot mapped to their vehicle, but then chooses not to accept the spot and requests a still further spot match. For example, the user may be prompted to identify a reason why the spot was not acceptable, such as the spot being taken by an unauthorized vehicle, being too small, being in a perceived unsafe location, being too dark, being too close to fast moving traffic, etc. Such data can be learned over time and update the map as well as improve matching to the particular customer preferences.

The parking data can further be extended to tie in with social media. For example, when user leaves a spot thereby creating a vacant spot in their former location, they notify an application, perhaps on their mobile device, to let their friends or other defined user group know where a free spot is available. The information may be shared a closed or limited group of chosen friends. The information may include not just parking availability, but convenience of the meeting spot in terms of proximity to a specified location or group, or shared event.

The effect of advertising parking can be enhanced through the network and parking location targeting. Also, it can be used as a support tool for vehicle sharing and multimodal mobility, i.e., more than one mode of transit such as a combination of a bicycle, a car, and one or more forms of public transit, may be given higher parking preference.

In another example, the server 125 can not only predict the availability of parking spaces and match those to requestors, but also can monitor the user request/demand for parking and track the data of time and as a function of various parameters (e.g., time of day, day of the week, month, season, weather, temperature, internet searches, etc.) to predict the demand for particular spots. The locations of dongles 160 in participating vehicles 101 can provide extra data that can be extrapolated across some or all of the entire vehicle 101 population in the system 100.

In controlling the cost or rate of parking, the rates may be adjusted based on predicted availability and demand, except that participants with a dongle may be provided discounted parking rates, and/or may be provided with more open spots than other users without a dongle. In other words, even if five spots may match the requests of a non-dongle users, only three may be communicated to said user, whereas all five may be communicated to a dongle user. Likewise, users of a shared vehicle 101 may receive increase parking space availability data in the same way as compared to users of a personal-only vehicle 101.

Note that the parking management system may designate certain available parking spaces based on resident classification. For example, during selected times or dates, certain spots may be reserved for residents of a particular region, as compared to non-residents. The dynamic adjustment of such classification may be based on the parking demand, the current level of parking spot availability, or combinations thereof. Further, it may be based on resident information, and parking statistics to decide which spots to make shared. Spots can dynamically change throughout the day based on historical and real-time data, and on a car by car basis. Further, the system may make residential parking available to non-residents using a parking occupancy map and resident vehicle location data, where resident preferences are learned over time based on parking behavior to determine when spots will be free.

In some examples, incentives may be provided to users looking for a parking spot that are going to have a multimodal trip, such as additionally using a bus, or other transportation type as part of an integrated trip requiring at least some parking.

A vehicle 101 computer 105 may be configured for communications on a controller area network (CAN) bus or the like, and/or other wire or wireless protocols, e.g., Bluetooth, etc., i.e., the computer can communicate via various mechanisms that may be provided in a vehicle 101, and can accordingly receive data 115 from sensors 110, communications via the network 120, e.g., form the server 125, etc. The computer 105 may also have a connection to an onboard diagnostics connector (OBD-II). Via the CAN bus, OBD-II, and/or other wired or wireless mechanisms.

As mentioned above, data collectors 110 may include a variety of devices. For example, various controllers in a vehicle, as mentioned above, may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like, e.g., medium range and long range sensors, for detecting, and possibly also obtaining information from, targets 160, e.g., as described further below, as well as other conditions outside the vehicle 101. For example, sensor data collectors 110 could include mechanisms such as radios, RADAR, lidar, sonar, cameras or other image capture devices, that could be deployed to detect targets 160 and/or obtain other collected data 115 relevant to autonomous operation of the vehicle 101, e.g., measure a distance between the vehicle 101 and other vehicles or objects, to detect other vehicles or objects, and/or to detect road conditions, such as curves, potholes, dips, bumps, changes in grade, etc. As yet a further example, GPS data 115 could be combined with 2D and/or 3D high resolution digital map data and/or basic data known as "Electronic Horizon data, such data, e.g., being stored in a memory of the computer 105.

The network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to the data store 130 as mentioned above, for storing collected data 115 received from one or more vehicles 101.

The server 125, may be accessible via a network, and may be one or more computer servers, each generally including at least one processor and at least one memory, the memory storing instructions executable by the processor, including instructions for carrying out various of the steps and processes described herein. The network may include one or more mechanisms by which a vehicle computer may communicate with the remote server 125, and/or other vehicles, user devices such as a smartphone, etc. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, a known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Figure 2:
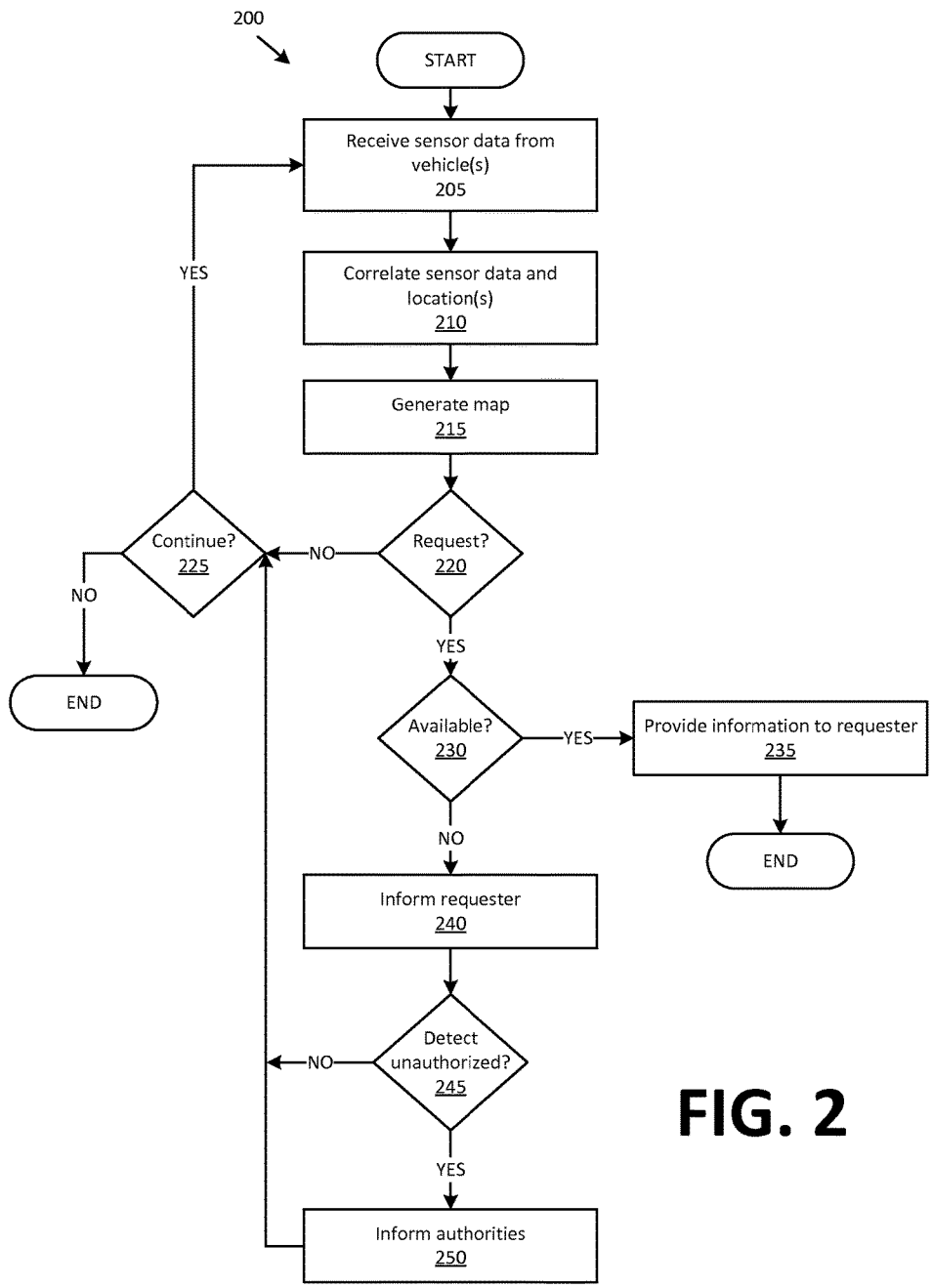
FIG. 2 illustrates an exemplary process for monitoring and/or controlling a parking system.

FIG. 2 illustrates an exemplary process for monitoring and/or controlling a parking system 100. The process 200 begins in a block 205, in which the server 125 receives data 110 from one or more vehicles 101. For example, as mentioned above, sensor data collectors 110 or other sources may provide data 115 to a computer 105 in a vehicle 101, which may then provide the data 115 to the server 125 via the network 120.

Following the block 205, in a block 210, the server 125 correlates received data 115 with a geographic area or set of locations monitored and/or controlled by the server 125. For example, vehicle 101 data 115 can include a location, e.g., geo-coordinates or the like, of the vehicle 101. From a location or locations of one or more vehicles 101 in the system 100, the server 125 can determine a geographic area for which the server 125 can provide parking information.

Accordingly, in a block 215 that follows the block 210, the server 125 generates a parking map 131. That is, based on locations of data 115 received from vehicles 101, the server 125 identifies areas and/or locations of parking spaces, and also provides an indication of a state of each identified parking space, e.g., empty or occupied. The server 125 may also determine whether a parking space is occupied by an authorized vehicle 101, or by an extra-system, unauthorized, vehicle 102. For example, if data 115 has not been received from a vehicle in a particular parking space, then the server 125 may be programmed to infer that the vehicle is an authorized vehicle 102.

Following the block 215, the server 125 determines whether a request has been received, i.e., from a vehicle 101, for a parking space. For example, a user device 150, an HMI of the computer 105, etc., could be used by a user to initiate a message from the computer 105 to the central server 125 indicating that a vehicle 101 seeks a parking space in a geographic area near, e.g., within 100 meter radius, of the vehicle 101. Alternatively, or additionally, the request could specify a street address, an intersection, and/or other parameters of an area or location with respect to which parking is requested. If no request is received, the process 200 proceeds to a block 225. If a request has been received, then a block 230 is executed next.

In the block 225, the server 125 determines whether the process 200 should continue. For example, the server 125 could provide parking services only at specified times, only when a certain number of vehicles 101 in excess of a predetermined threshold for a given geographic area were participating in the system 100, etc. In any event, if the process 200 should continue, then the block 205 is executed next. Otherwise, the process 200 ends.

The block 230 may follow the block 220. In the block 230, the server 125 determines whether a parking space is available pursuant to the user request. Such determination may occur according to criteria discussed above, such as whether a vehicle 101 will fit in a parking space, whether the parking space is cheapest for the user's planned duration of parking as opposed to other available spaces, proximity to a destination address, etc. If an appropriate parking space is available, then a block 235 is executed next. Otherwise, the process 200 proceeds to a block 240.

In the block 235, the server 125 provides information concerning an available parking space meeting user request parameters to the computer 105 in the requesting vehicle 101. The server 125 may provide other information, such as navigational suggestions, pricing information, etc. Following the block 235, the process 200 generally ends. However, note that the server 125 could also obtain information concerning parking spaces in a geographic area other than the parking space recommended for a user, and could provide information concerning whether authorized vehicles 100 one or unauthorized vehicles 100 to occupy such spaces, and could take action, e.g., as discussed below with respect to the blocks 245, 250.

In the block 240, which may follow the block 230, the server 125 responds to the request detected in the block 220 by sending a message that a requested a parking space is presently unavailable. A vehicle 101 computer 105 may receive the message and display it via an HMI or the like.

Following the block 240, in the block 245, the server 125 determines whether the object occupying a requested a parking space is an unauthorized vehicle 102. For example, as mentioned above, if a detected object is a vehicle not participating in the system 100, the computer 125 may determine that it is an unauthorized vehicle 102. If an unauthorized vehicle 102 is detected, then a block 250 is executed next. Otherwise, the process 200 proceeds to the block 225.

In the block 250, the computer 125 sends a message, e.g., to another computer server via the network 120, informing appropriate authorities, e.g., parking enforcement authorities, that a parking space is improperly occupied, or is occupied without authorization.

In general, computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer, the computer comprising a processor and a memory, wherein the computer is programmed to:
   receive a request for a parking space from a requesting vehicle, wherein the request is provided from a portable device in the requesting vehicle;
   receive, from at least one data-collecting vehicle, data related to at least one parking space;
   generate, based at least in part on the received data, a parking availability map indicating a parking space matched to the requesting vehicle; and,
   upon identifying the parking space matched to the requesting vehicle at least in part based on identifying that the request was provided from the portable device, and determining that the parking space matched to the requesting vehicle is occupied by an unauthorized vehicle at least in part based on sensor data from at least one of the requesting vehicle and the data-collecting vehicle driving near the parking space, provide a message to a parking enforcement authority that the parking space matched to the requesting vehicle is occupied by an unauthorized vehicle.

2. The system of claim 1, wherein the computer is further programmed to provide a message to the requesting vehicle that the parking space is unavailable.

3. The system of claim 1, wherein the computer is further programmed to provide a message to the requesting vehicle that the parking space is available.

4. The system of claim 3, wherein the computer is further programmed to provide navigational guidance to the requesting vehicle to locate the parking space.

5. The system of claim 1, wherein the computer is programmed to identify the parking space based on a location of the parking space and at least one of a size of the parking space and a cost of the parking space.

6. The system of claim 1, wherein the at least one data-collecting vehicle includes the requesting vehicle.

7. The system of claim 1, wherein the computer is further programmed to identify the parking space in response to the request based at least in part on a time of day.

8. A method, comprising:
   receiving a request for a parking space from a requesting vehicle, wherein the request is provided from a portable device in the requesting vehicle;
   receiving, from at least one data-collecting vehicle, data related to at least one parking space;

generating, based at least in part on the received data, a parking availability map indicating a parking space matched to the requesting vehicle; and, upon identifying the parking space matched to the requesting vehicle at least in part based on identifying that the request was provided from the portable device, and determining that the parking space matched to the requesting vehicle is occupied by an unauthorized vehicle at least in part based on sensor data from at least one of the requesting vehicle and the data-collecting vehicle driving near the parking space, providing a message to a parking enforcement authority that the parking space matched to the requesting vehicle is occupied by an unauthorized vehicle.

9. The method of claim 8, further comprising providing a message to the requesting vehicle that the parking space is unavailable.

10. The method of claim 8, further comprising providing a message to the requesting vehicle that the parking space is available.

11. The method of claim 10, further comprising providing navigational guidance to the requesting vehicle to locate the parking space.

12. The method of claim 8, further comprising identifying the parking space based on a location of the parking space and at least one of a size of the parking space and a cost of the parking space.

13. The method of claim 8, wherein the at least one data-collecting vehicle includes the requesting vehicle.

14. The method of claim 8, further comprising identifying the parking space in response to the request based at least in part on a time of day.

* * * * *